(12) United States Patent (10) Patent No.: US 12,679,225 B2

Jessup et al. (45) Date of Patent: Jul. 14, 2026

(54) COMBINATION BATTERY AND BATTERY CHARGER CONSTRUCT FOR ELECTRIC INDUSTRIAL TRUCKS

(71) Applicant: KION North America Corporation, Summerville, SC (US)

(72) Inventors: Edwin Lee Jessup, Mt. Pleasant, SC (US); John Pizarro, Charleston, SC (US); Christian Bartl, Rochester, MI (US)

( * ) Notice: Subject to any disclaimer, the term of this patent is extended or adjusted under 35 U.S.C. 154(b) by 722 days.

(21) Appl. No.: 17/992,552

(22) Filed: Nov. 22, 2022

(65) Prior Publication Data

US 2024/0166071 A1 May 23, 2024

(51) Int. Cl.
| | |
|---|---|
| *B60L 50/64* | (2019.01) |
| *B60L 53/16* | (2019.01) |
| *B60L 53/30* | (2019.01) |
| *B60L 53/62* | (2019.01) |
| *H02J 7/70* | (2026.01) |

(52) U.S. Cl.
CPC .............. *B60L 50/64* (2019.02); *B60L 53/16* (2019.02); *B60L 53/305* (2019.02); *B60L 53/62* (2019.02); *H02J 7/70* (2026.01)

(58) Field of Classification Search
CPC ...................................................... B60L 50/64
USPC ........................................................ 320/109
See application file for complete search history.

(56) References Cited

U.S. PATENT DOCUMENTS

| | | | | |
|---|---|---|---|---|
| 5,146,149 A | * | 9/1992 | Nilssen | H01M 10/46 |
| | | | | 320/112 |
| 5,510,694 A | * | 4/1996 | Nilssen | H02J 7/0042 |
| | | | | 320/113 |
| 5,760,569 A | | 6/1998 | Chase, Jr. | |
| 7,712,563 B2 | | 5/2010 | Niebuhr | |
| 8,573,994 B2 | * | 11/2013 | Kiko | B60L 3/0069 |
| | | | | 439/372 |
| 8,833,736 B2 | | 9/2014 | Feiquan et al. | |
| 9,586,605 B2 | | 3/2017 | He et al. | |
| 10,150,373 B2 | | 12/2018 | Biagini et al. | |
| 10,479,205 B2 | * | 11/2019 | Park | B60L 53/16 |

(Continued)

FOREIGN PATENT DOCUMENTS

| | | |
|---|---|---|
| CA | 3089338 | 10/2019 |
| WO | WO199831088 | 7/1998 |

(Continued)

OTHER PUBLICATIONS

BYD North America, Build Your Dreams.

(Continued)

*Primary Examiner* — Jerry D Robbins
(74) *Attorney, Agent, or Firm* — Bill Killough

(57) ABSTRACT

A combination battery and battery charger construct for a vehicle such as an industrial truck. The battery comprises a battery charger construct that is attached to the battery so that the battery charger construct is resident on the battery. The battery charger construct comprises a battery chargers or battery chargers. A socket communicates with the battery charger(s) of the battery charger construct, and provides an electrical current input to the battery charger construct. The device is used with batteries for industrial vehicles that have an output of 90 volts or less.

15 Claims, 6 Drawing Sheets

(56) References Cited

U.S. PATENT DOCUMENTS

| | | | | |
|---|---|---|---|---|
| 2003/0001540 A1* | 1/2003 | Ferreira | ................ | H02J 7/0042 |
| | | | | 320/112 |
| 2009/0039705 A1 | 2/2009 | Lyman | | |
| 2011/0106294 A1* | 5/2011 | Bebbington | ............ | B60L 53/80 |
| | | | | 700/218 |
| 2012/0330489 A1* | 12/2012 | Masuda | ................ | B60L 3/0069 |
| | | | | 701/22 |
| 2013/0049689 A1 | 2/2013 | Hayashigawa et al. | | |
| 2013/0078841 A1* | 3/2013 | Ferguson | .......... | H01R 13/6397 |
| | | | | 439/350 |
| 2015/0015200 A1* | 1/2015 | Kim | ........................ | B60L 53/60 |
| | | | | 320/109 |
| 2015/0048644 A1* | 2/2015 | Georgi | .................... | E05B 83/34 |
| | | | | 296/97.22 |
| 2015/0102775 A1* | 4/2015 | Von Novak, III | ...... | B60L 53/63 |
| | | | | 320/109 |
| 2015/0266388 A1* | 9/2015 | Im | ........................ | B60L 53/305 |
| | | | | 320/109 |
| 2016/0059719 A1* | 3/2016 | Jung | ........................ | B60L 3/00 |
| | | | | 320/109 |
| 2018/0339596 A1* | 11/2018 | Ulrich | .................... | B60L 53/16 |
| 2019/0103639 A1* | 4/2019 | Guglielmo | .......... | H01M 50/284 |
| 2020/0039359 A1* | 2/2020 | Salter | ...................... | B60L 53/18 |
| 2021/0091438 A1* | 3/2021 | Backhaus | .......... | H01M 50/342 |
| 2022/0098017 A1 | 3/2022 | Di Florio et al. | | |
| 2023/0398891 A1* | 12/2023 | Madden | .................. | B60L 53/36 |
| 2024/0011346 A1* | 1/2024 | Sproule | .................. | E05B 83/34 |
| 2024/0283077 A1* | 8/2024 | Guglielmo | ............ | H02J 7/0042 |
| 2024/0304875 A1* | 9/2024 | Jin | ...................... | H01M 50/188 |

FOREIGN PATENT DOCUMENTS

| | | |
|---|---|---|
| WO | WO02067346 | 8/2002 |
| WO | WO2022023976 | 2/2022 |

OTHER PUBLICATIONS

Todd Marcucci, How the J1772 charging standard for plug-in vehicles works, Sep. 17, 2013, https://www.edn.com/how-the-j1772-charging-standard-for-plug-in-vehicles-works.

* cited by examiner

COMBINATION BATTERY AND BATTERY CHARGER CONSTRUCT FOR ELECTRIC INDUSTRIAL TRUCKS

BACKGROUND OF THE INVENTION

Electrically powered vehicles are becoming increasingly prevalent. Hydrocarbon fuels for vehicles have limited long term supply, and such vehicles contribute to carbon emissions. As battery technology improves, electric vehicles have increasing prevalence and utility.

An issue with electric vehicles is the availability of charging stations. Small industrial trucks, such as forklifts, may be transported for temporary use at multiple locations, since the need for the industrial truck may be only for a few days or a few weeks. The locations will not have on-site charging availability.

An example of limited on-site electrical availability is a construction site. The construction site will have 110 volt and/or 208-240 volt single phase alternating current, but it will not typically have a charging station for industrial trucks, and almost certainly will not have a charging station for electric industrial trucks of varying voltage requirements. The need for the industrial truck is limited in time. Placing a charging station on-site for a single industrial truck increase expense, and risks damage and vandalism to the charging station. Different trucks may have different charging requirements, and placing multiple chargers on-site is even less desirable.

Further, it is desirable to have the ability to fully charge the industrial truck within a relatively short period of time. The charger should have the capability of charging the industrial truck such as at night when on-site operations have ceased.

There is a need for a device that allows charging of electrically powered industrial trucks where there is no on-site charging station, but where alternating current of common voltages is available.

SUMMARY OF THE INVENTION

The present invention is a combination battery and battery charger construct for a vehicle such as an industrial truck. The battery comprises a battery charger construct that is attached to the battery so that the chargers, when the battery is placed in the industrial truck, are resident on the battery. The battery charger construct comprises a battery chargers or battery chargers. A socket communicates with the battery charger(s) of the battery charger construct, and provides an electrical current input to the battery charger construct. The socket is constructed and arranged to receive an electrical vehicle service equipment cable. The device is used with industrial trucks that use 90 volt or less, at 86 KWh or less. The device can fully charge the battery in 8 hours or less with 208/240 volt, 50-60 Hz alternating current input to the battery charger(s). The industrial truck can be used for a day, and the battery is fully charged overnight using electrical service that is found in most locations.

BRIEF DRAWING DESCRIPTION

FIG. 1 is a perspective view of a battery and battery charger construct according to the invention.

FIG. 2 demonstrates the battery and battery charger construct of FIG. 1 mounted in an industrial truck.

DESCRIPTION OF PREFERRED EMBODIMENTS

Figure 1:
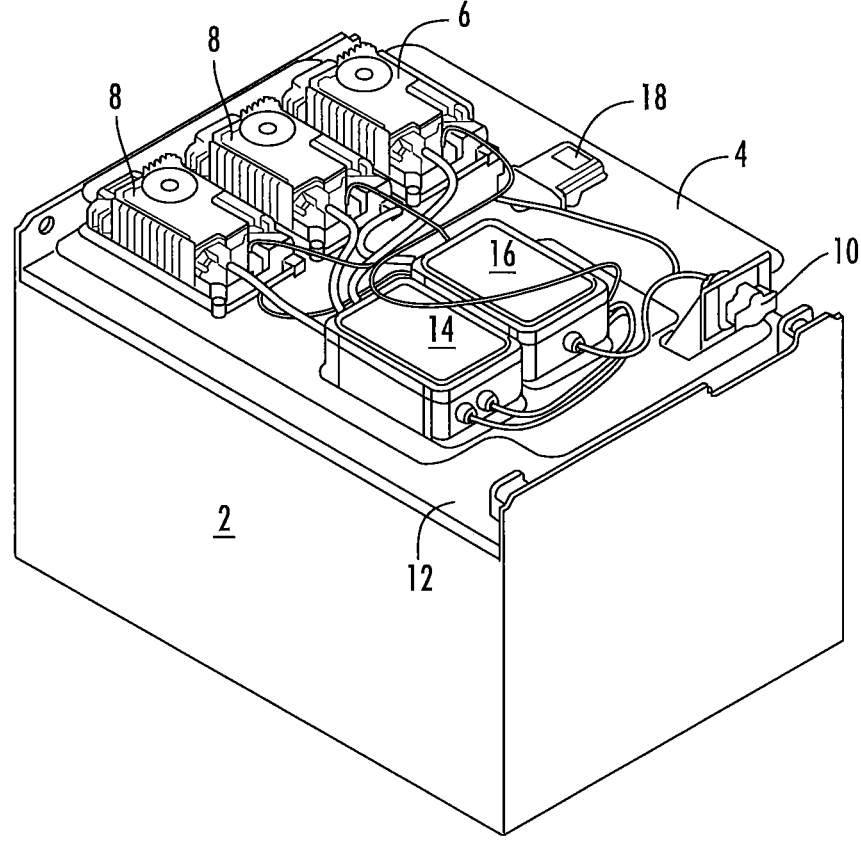
Figure 7:
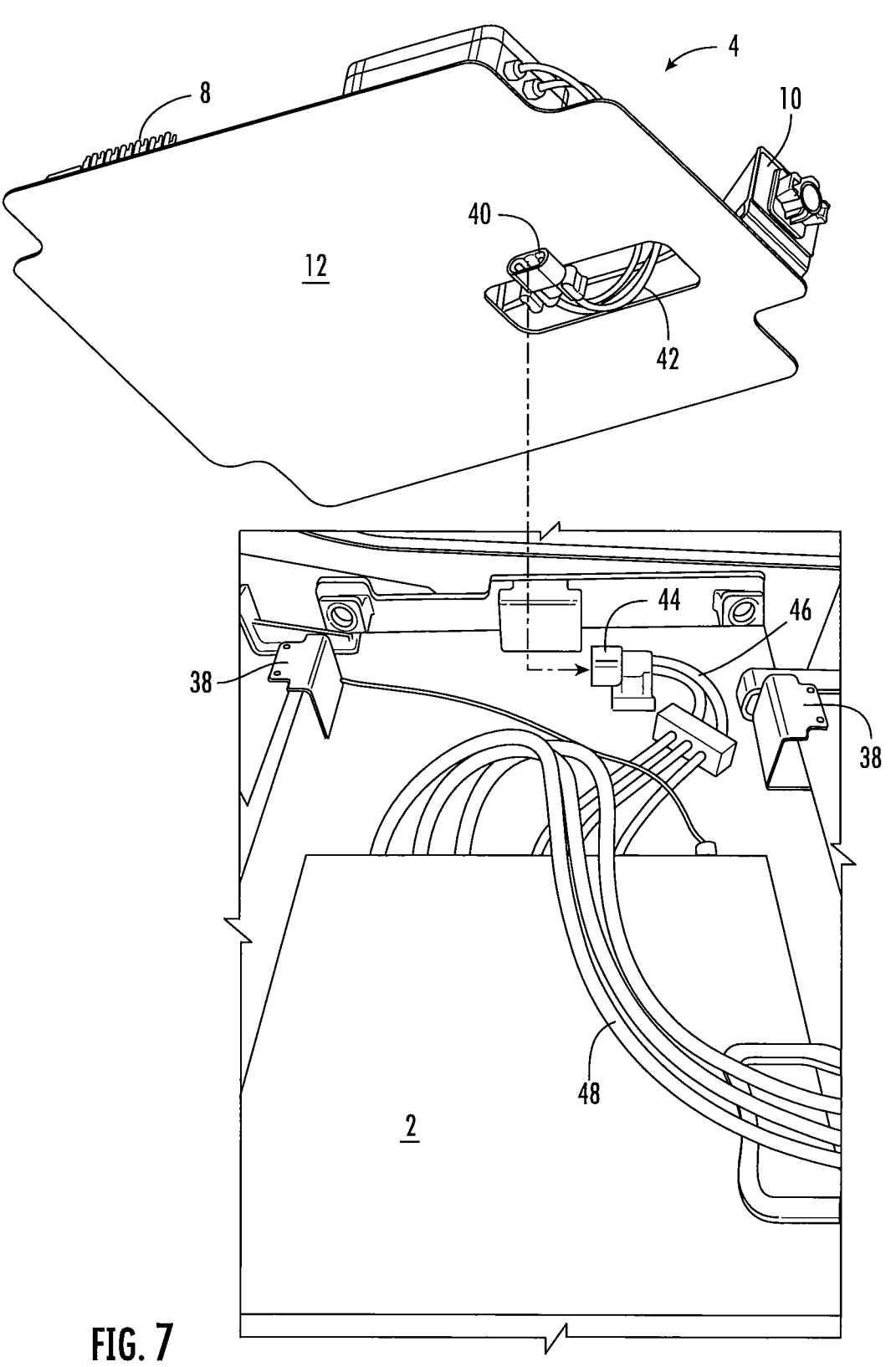
FIG. 7 shows an example of electrical connection of the battery to the battery charger construct, and electrical connection of the battery to the industrial truck.

FIG. 1 shows the charger construct 4 of the invention attached to the battery 2 to form the combination battery and battery charger construct. By "attached to the battery" it is meant that the battery charger construct is physically mounted to the battery or battery housing with fasteners such as screws or cap screws or the like, or even more permanently, so that the charger construct cannot be removed without the use of tools. The charger mounting plate 12 may be formed as part of the battery housing or it may be attached as a separate unit and attached to the battery, with the components of the battery charging construct attached to the battery by the charger mounting plate. The battery charger construct attached to the battery, and resident on the battery, forms the combination battery and battery charger construct according to the invention. The charger plate in one embodiment is attached to the battery by screws that engage battery mounting points 38 (FIG. 7).

The battery may be a lithium based battery, such as (lithium-Ion (Li-On), nickel-metal hybrid (NiMH), lead acid (SLA), or ultracapacitor. The examples herein are for LI-On batteries, but these examples are not intended to be limiting. All of the batteries require periodic recharging, which will also be the case with new battery technologies under development. The batteries according to the invention are useful for industrial trucks that use batteries ranging from 24 V DC to 90 V DC, using batteries with a capacity of 4 KWh to 90 KWh.

Figure 4:
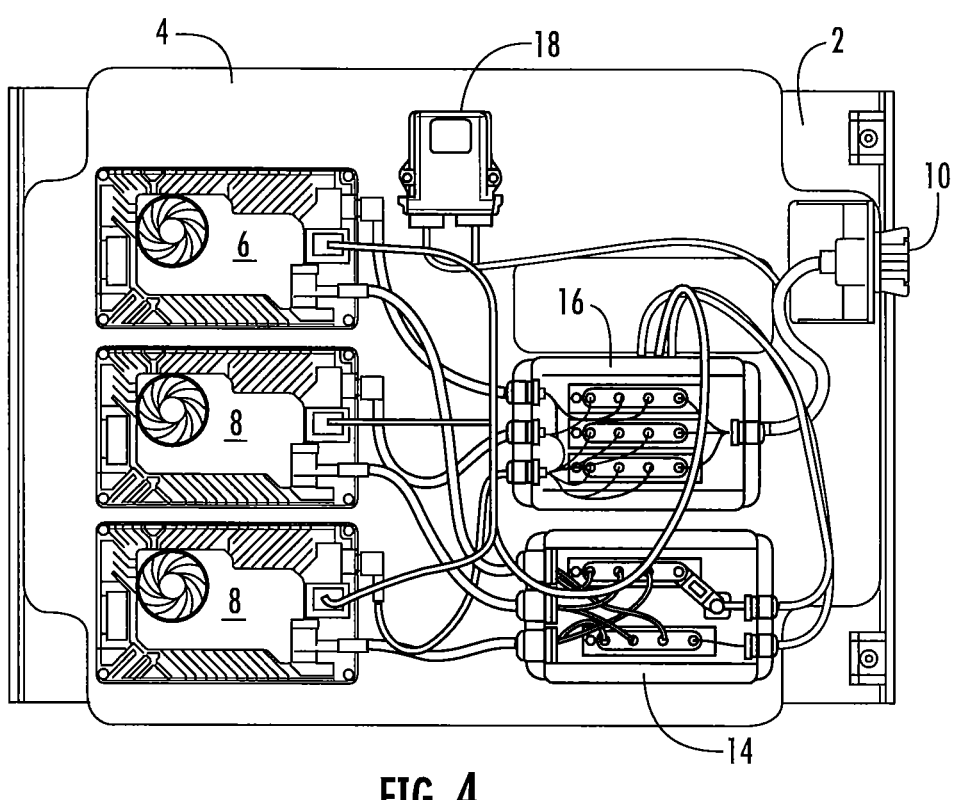
FIG. 4 is a top plan view of the battery charger construct.

The charger construct 4 in a preferred embodiment comprises a direct current (DC) terminal housing 14, an alternating current (AC) terminal housing 16, and may comprise three (3) battery chargers 6, 8 in the embodiment shown. FIG. 4. The charger construct also has a socket 10 for receiving a power cable. The socket is preferred to be constructed to receive a J1772 plug of an electric vehicle service equipment (EVSE) cable 24, which acts as a power cable for the battery charger construct. Also included in this embodiment is an electric vehicle charge controller 18. Each of these components is attached to the battery, either directly or by attachment to a battery charger mounting plate 12 that is attached to the battery.

The battery charging construct and power cord 24 operate according to SAE J1772 standard (SAE Surface Vehicle Recommended Practice J1772, SAE Electric Vehicle Conductive Charge Coupler). The SAE J1772 standard defines how the battery charging construct connects with, communicates with, and charges the battery. The EVSE manages the link of the AC power source to the battery.

The battery charging construct has an AC-DC converter that rectifies the EVSE AC output to a level appropriate for charging the battery. As shown in the drawings, the AC-DC converter communicates via the J1772 protocol and commands the EVSE via the Vehicle Control Interface Module (VCIM) 18 to energize the battery via the battery charger or chargers.

Figure 2:
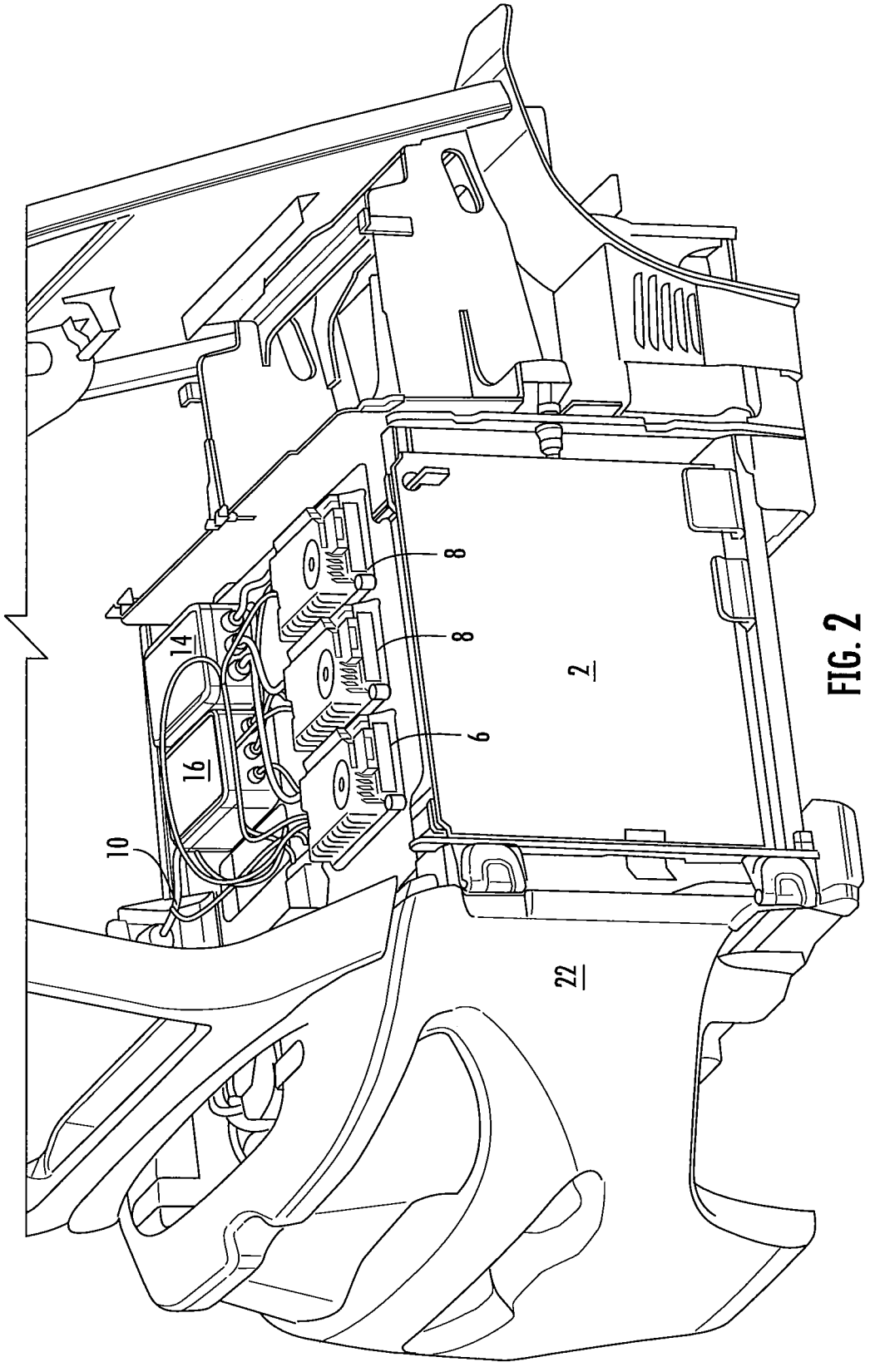

The combination battery 2 and battery charger construct 4 are placed within an electrically powered industrial truck as shown in the embodiment of FIG. 2. It is preferred that the combination battery and battery charger construct slides into a compartment in the electrically powered industrial truck so that the battery and battery charger construct are removable and easily replaceable as a unit in the event of a defect in the battery 2 and battery charger construct 4 or if a battery becomes discharged. Due to weight, an industrial truck, such as a forklift or a powered lift may be useful in making the swap of the battery and charger construct. The battery may be charged while located in an industrial truck, or while dissociated from an industrial truck.

In one embodiment the industrial truck is an electrically powered forklift that uses an 80 V-90 V 460 Ah lithium-ion battery. Three Delta-Q™ 1500 W chargers are attached to the battery and are positioned top of the battery as shown in the drawings. FIG. 4. A "master" charger 6 and two slave chargers 8 are provided in this embodiment. A DC terminal housing 14 is shown, and an AC terminal housing 16 is shown. The components are connected with wiring harnesses as shown. The use of 1500 watt chargers allows the voltage to be scaled by changing the current. Three (3) 1500 W chargers scaled to 4500 W allows a 90 V 460 Ah industrial truck battery with an input 208/240 volts AC to be fully charged in about 8 hours for a battery in good condition. The device is used with industrial trucks that have an output of 90 volts or less so that full charging is accomplished within a time period having utility for industrial trucks. In this embodiment, the vehicle can be used for a day, and is fully charged overnight using electrical service that is found in most locations, including construction sites. Actual current usage is determined by the battery application of the industrial truck. The time and output of the battery charger or battery chargers may be scaled according to the battery capacity and charging time requirements, with more or fewer battery chargers of more or less capacity resident on the battery to form the battery and battery charger unit. The example embodiment described herein allows charging at 110 V/120 V, but the time for charging is increased over the use of 208 V/240 V. Examples of batteries characteristically used with industrial trucks such as forklifts are listed:

| Forklifts | | |
|---|---|---|
| Voltage | Ah | kWh |
| 24 | 170 | 4 |
| 24 | 1000 | 24 |
| 36 | 625 | 23 |
| 36 | 1190 | 43 |
| 48 | 465 | 22 |
| 48 | 930 | 45 |
| 80 | 360 | 29 |
| 80 | 1080 | 86 |

Batteries, as used by industrial trucks typically weigh from 150 Kg to 3200 Kg. The weight of the battery and resident charger construct is beneficial when used with industrial trucks that require counterbalancing. The battery performs the dual function of providing counterbalance while also providing a power source for the industrial truck. Examples of such industrial trucks that require counterbalancing are electrically powered forklifts and electrically powered front end loaders, and industrial trucks that carry a payload generally in front of the front wheels or in front of the tracks ("counterbalance trucks"). The battery is positioned to the rear of the front wheels or to the rear of the front of the tracks of the industrial vehicle. The battery may be positioned near a center of some industrial trucks to provide overall balance for the industrial truck.

FIG. 7 shows an example of electrical connections between the battery 2 and the battery charger construct that is attached to the battery and is resident on the battery. In this embodiment electrical leads 42 from the battery charger construct are terminated in plug 40. The electrical leads and plug extend through an opening in the charger plate 12. The plug 40 engages plug 44 of the battery, which communicates DC current through electrical leads 46 to charge the battery. Electrical leads 48 extend from the battery to the industrial vehicle to provide DC current to power the industrial truck. The electrical connection of the battery charger construct to the battery could be direct and without the use of plugs.

Figure 3:
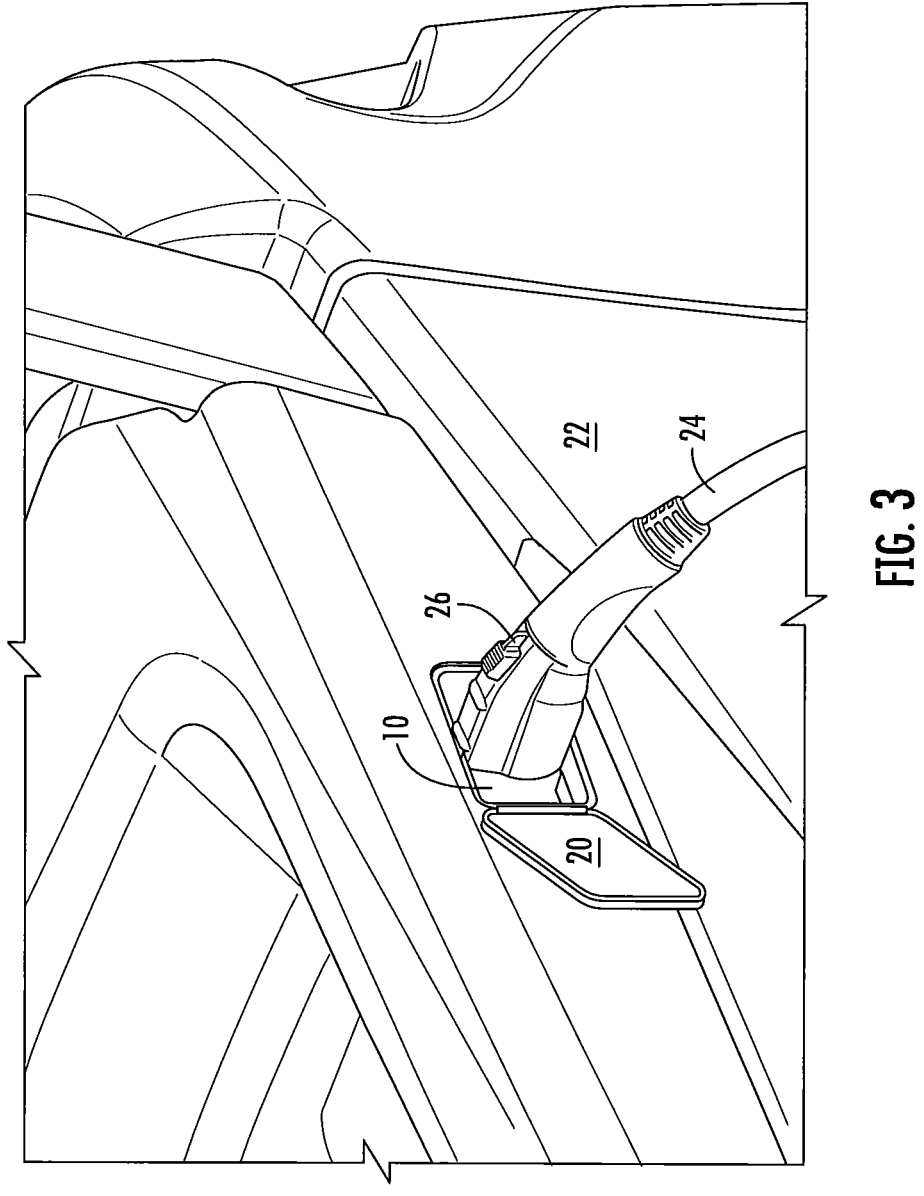
FIG. 3 shows a J1772 plug of an electric vehicle service equipment cable connected to a socket that is part of the battery and battery charger construct.

An opening in a side of the industrial truck 22 reveals the socket 10 of the charger construct. FIG. 3. The opening has a door 20 that is similar to a fuel door commonly found on cars and trucks. The fuel door acts as a switch that disables mobility of the industrial truck when the door is open. In other words, when the door is open to reveal the socket, the industrial truck cannot be driven since the electric drive motor of the industrial truck is disabled. This interlock feature prevents the industrial truck from being driven while the power cable 24 is engaged in the socket, and reduces the likelihood that the power cable will be lost due to the operator leaving the power cable behind after charging. Further, the interlock feature reduces the likelihood of the industrial truck being driven away with the power cable engaged, which may damage the charger construct.

The door 20 acts as, or communicates with, a switch. When the door is open, power availability to the electric drive motor of the industrial truck is interrupted. The switch may be in a circuit with a relay. The relay may be positioned in the electrical circuit that supplies power from the battery to the electric motor in the drive train of the industrial truck.

Figure 5:
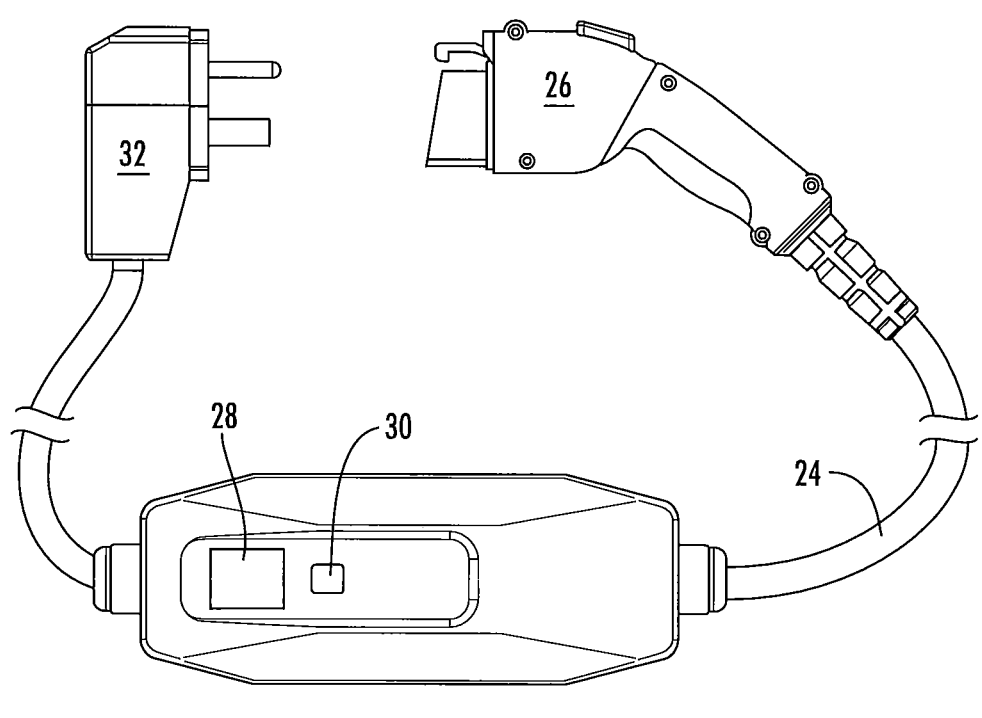
FIG. 5 is an isolation of a power cable useful with the device.

An exemplary power cable 24 is shown in FIG. 5. The EVSE power cable is preferred to have a J1772 plug 26 that engages the socket 10 of the battery and battery charger construct. Other features of this power cable are a screen 28 that provides an LCD readout of charging information, such a rate of charge and charge status. A switch 30 allows the current to be switched, such as from a 16 amp to a 32 amp charge rate. Charging at 110 VV-120 V may be performed at a 16 amp charge rate, whereas 208 V/240 V charging may take place at 32 amp charge rate. The power cable has a plug 32 that engages a common outlet of an alternating current source.

Figure 6A:
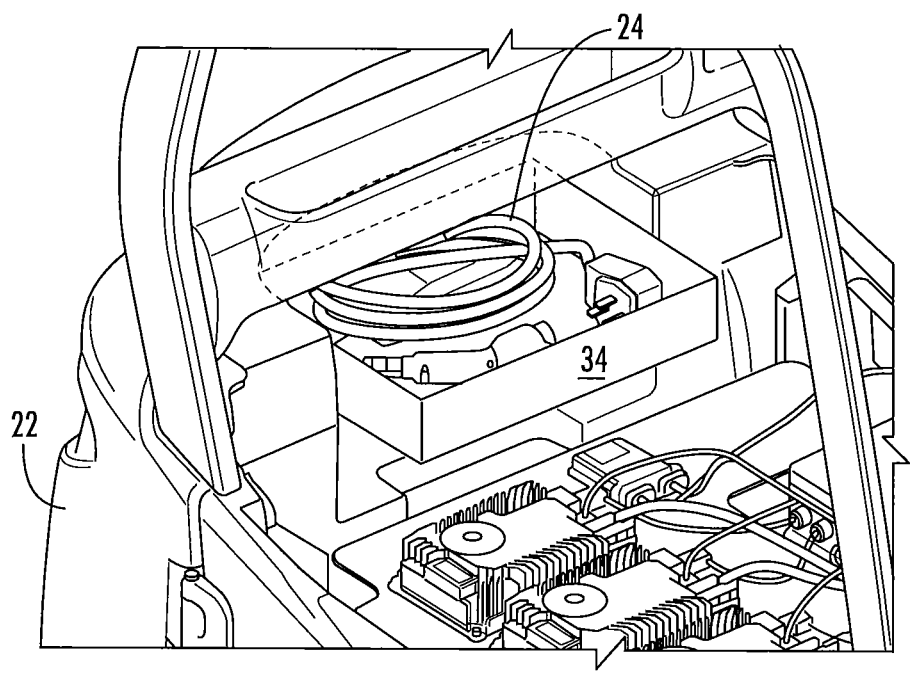
FIG. 6A is a view of a storage compartment for the power cable that is located in an industrial truck.
Figure 6B:
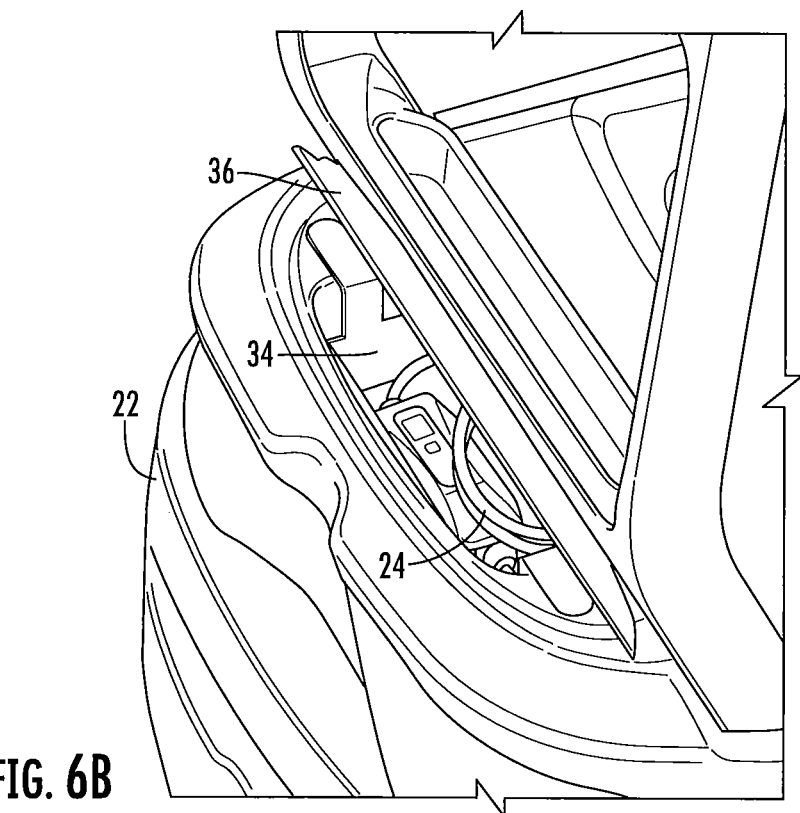
FIG. 6B is another view of a storage compartment for the power cable that is located in an industrial truck.

FIGS. 6A and 6B show a storage compartment 34 located in the industrial truck 22. As with the door to the socket, the storage compartment has a door 36 that acts as a switch. When the door is open, power availability to the electric motor of the industrial truck is interrupted. The switch may be in a circuit with a relay. The relay may be positioned in the electrical circuit that supplies power from the battery to the electric motor in the drive train of the industrial truck. The provision of a storage compartment with a door that acts as an interlock provides storage for the power cable reducing the likelihood that the power cable will be lost. If the power cable 24 is removed from the storage compartment and the door is open, the industrial truck cannot be driven away, acting as a reminder to the operator to place the cable in the storage compartment and close the storage compartment door. The interlocking door to the socket 20 and the interlocking door 36 to the storage compartment, in combination, greatly reduce the likelihood of a drive off of the industrial truck leaving the power cable behind.

In use, the battery, with the battery charger construct resident on the battery to form the combination, is placed in the industrial truck and connected to the power circuit of the industrial truck. Power cable 24 is removed from the storage compartment 34 and connected to socket 10. The power cable is plugged into an AC power source by plug 32. The chargers 6, 8 charge the battery 2. After the battery is fully charged, the power cable is disengaged from the socket and the AC power source. The access door 20 is closed and the power cable is placed into storage compartment. The door 36 to the storage compartment is closed. Unless both door 20 and door 36 are closed, the industrial truck cannot be driven away.

Examples of powered industrial trucks include forklifts, platform lift trucks, motorized hand trucks The invention is also useful with industrial trucks in the nature of construction equipment that operates within the power constraints defined herein, such as track loaders and scissor lifts. The invention is also useful with industrial trucks in the nature of agricultural equipment that operates within the power constraints defined herein, such as small tractors or elevators.

The combination battery and battery charger construct is suitable for smaller vehicles that operate on relatively low voltages of battery output. The combination battery and battery charger construct is not intended for higher DC voltage vehicles or those having higher KWh outputs, such as automobiles or trucks that operate with higher power consumption and at highway speeds.

What is claimed:

1. A combination battery and battery charger construct for an industrial truck, comprising:

a battery for an industrial truck, a battery charger construct resident on the battery, wherein the battery charger construct comprises a battery charger and a socket that communicates with the battery charger of the battery charger construct, and wherein the socket is constructed and arranged to receive an electrical vehicle service equipment cable comprising a plug constructed according to SAE J1772, and the electrical vehicle service equipment cable comprises a plug constructed according to SAE J1772, and wherein a vehicle control interface module manages SAE J1772 communication protocol to energize the battery via the battery charger construct.

2. The combination battery and battery charger construct for an industrial truck described in claim 1, wherein the battery charger construct further comprises a mounting plate, and wherein a plurality of battery chargers is attached to the mounting plate, and wherein the mounting plate is attached to the battery.

3. The combination battery and battery charger construct for an industrial truck described in claim 1, wherein the battery charger construct further comprises a mounting plate, and wherein a plurality of battery chargers is attached to the mounting plate, and wherein the mounting plate is attached to the battery, and wherein the battery charging construct is attached to an exterior surface of the battery.

4. The combination battery and battery charger construct for an industrial truck described in claim 1, wherein the battery charger construct is attached to an interior of a housing of the industrial truck.

5. The combination battery and battery charger construct for an industrial truck described in claim 1, wherein the socket is positioned behind a door located on an industrial truck, and when the door is in position for access to the socket from an exterior of the industrial truck, the industrial truck is disabled.

6. The combination battery and battery charger construct for an industrial truck described in claim 1, wherein the battery is a battery having a capacity of 4 KWh to 86 KWh.

7. The combination battery and battery charger construct for an industrial truck described in claim 1, wherein the battery is located in an industrial truck, and the industrial truck comprises a storage compartment for the electrical vehicle service cable, the storage compartment comprising an access door, and when the access door is in position for access to the storage compartment from the exterior of the industrial truck, the industrial truck is disabled.

8. The combination battery and battery charger construct for an industrial truck described in claim 1, wherein the battery is positioned in an industrial truck, and the industrial truck is a forklift.

9. The combination battery and battery charger construct for an industrial truck described in claim 8, wherein the battery and battery charger construct are positioned in the forklift to provide power for the industrial truck and to provide counterbalance for the forklift.

10. The combination battery and battery charger construct for an industrial truck described in claim 1, wherein charge time for a 90V battery with 208V/240V alternating current input to the battery charger construct is eight hours or less.

11. The combination battery and battery charger construct for an industrial truck described in claim 1, wherein the battery is positioned in an industrial truck that is a type of construction equipment.

12. The combination battery and battery charger construct for an industrial truck described in claim 1, wherein the battery is positioned in an industrial truck that is a type of agricultural equipment.

13. The combination battery and battery charger construct for an industrial truck described in claim 1, wherein the socket is positioned within a footprint of the battery charger construct that is resident on the battery, and wherein the battery has an output of 90 volts or less and the battery charging construct charges the battery with an input of 110 volts to 120 volts alternating current received by the electrical service equipment cable.

14. The combination battery and battery charger construct for an industrial truck described in claim 1, wherein the electrical service equipment cable receives alternating current, and the charging construct comprises an alternating current to direct current converter that rectifies the alternating current from the electrical service equipment cable, and wherein the converter communicates via SAE J1772 protocol.

15. The combination battery and battery charger construct for an industrial truck described in claim 1, wherein the battery has an output of 90 volts or less and the battery charging construct charges the battery with an input of 110 volts to 120 volts alternating current received from the electrical service equipment cable.

\* \* \* \* \*